United States Patent [19]
Nelson

[11] Patent Number: 5,433,455
[45] Date of Patent: Jul. 18, 1995

[54] GASKET BOOKLET

[76] Inventor: William A. Nelson, 10010 Camden, Livonia, Mich. 48150

[21] Appl. No.: 85,178

[22] Filed: Jul. 2, 1993

[51] Int. Cl.$^6$ ............................................. F16J 15/00
[52] U.S. Cl. .............................. 277/199; 277/235 B; 281/31; 402/79
[58] Field of Search .............. 277/199, 235 B; 281/31, 281/38, 51; 402/79

[56] References Cited

U.S. PATENT DOCUMENTS

| | | | |
|---|---|---|---|
| 807,648 | 12/1905 | Wiggins | 281/31 |
| 1,567,406 | 12/1925 | Wilke | 281/38 X |
| 1,593,301 | 7/1926 | Havemeyer | 281/38 |
| 1,927,266 | 9/1933 | Huttner | 281/38 |
| 2,475,067 | 7/1949 | Wege | 281/31 |
| 3,438,117 | 4/1969 | Engleman | 277/199 |
| 3,583,711 | 6/1971 | Engleman | 277/199 |
| 3,930,700 | 1/1976 | Figueres | 281/38 |
| 4,596,407 | 6/1986 | Suska | 281/38 X |
| 4,690,413 | 9/1987 | Adkins | 277/199 |
| 4,993,749 | 2/1991 | Volk | 281/38 |

FOREIGN PATENT DOCUMENTS 2222507 11/1973 Germany .......................... 277/235 B Primary Examiner—William A. Cuchlinski, Jr.
Assistant Examiner—John L. Beres
Attorney, Agent, or Firm—Charles W. Chandler

[57] ABSTRACT

A booklet having pages of a gasket material, are attached together to form a booklet. Several pages have a scored outline of a gasket member. Each gasket member can be individually removed from its corresponding page. The booklet has a cover with a pocket for storing a loose gasket. The booklet has a width and thickness permitting it to be inserted in the user's pocket.

1 Claim, 2 Drawing Sheets

GASKET BOOKLET

BACKGROUND OF THE INVENTION

This invention is related to a booklet having several sheets of gasket material scored with the outlines of a set of gaskets so that the user can remove an individual gasket member from the booklet when needed.

Servicemen for refrigeration equipment and the like, usually require several gaskets in order to repair equipment, such as the suction and discharge lines of compressors, expansion valves, and so forth.

The gasket shapes are generally standardized for the industry. Different gaskets have different thicknesses. Usually the gaskets are supplied individually so that the user must carry several loose gaskets with him when making his repairs. The loose gaskets are inconvenient to carry. Sometimes a necessary gasket is unavailable.

Some prior art patents related to gasket materials which are scored from a sheet of gasket material or treated so that an individual gasket may be removed, include U.S. Pat. No. 3,583,711 which was issued to Donald E. Engleman, Jun. 8, 1971 for a "Collapsible Sealing Gasket" and U.S. Pat. No. 4,690,413 for an invention by Ernest Adkins, Sep. 1, 1987 for "Gaskets".

SUMMARY OF THE INVENTION

The broad purpose of the present invention is to provide a booklet comprising several pages of gasket material. Some of the pages are scored with the profile of several individual gaskets. The gaskets on a particular page may either be identical or different. The gaskets in the booklet are selected according to those gaskets commonly required to repair an item of mechanical equipment. Some of the pages may have a different thickness than other pages depending upon the required gasket thickness, The booklet cover has a pocket for temporally storing an individual loose gasket.

Preferably, the book has a width of 3¾ inches and a length of 8½ inches so that it can be readily received in the user's trouser pocket.

The user then has all the gaskets necessary for refrigeration repairs in one compact unit. All commonly used the gaskets are available.

Still further objects and advantages of the invention will become readily apparent to those skilled in the art to which the invention pertains upon reference to the following detailed description.

DESCRIPTION OF THE DRAWING

The description refers to the accompanying drawings in which like reference characters refer to like parts throughout the several views, and in which.

DESCRIPTION OF THE PREFERRED EMBODIMENT

Figure 1:
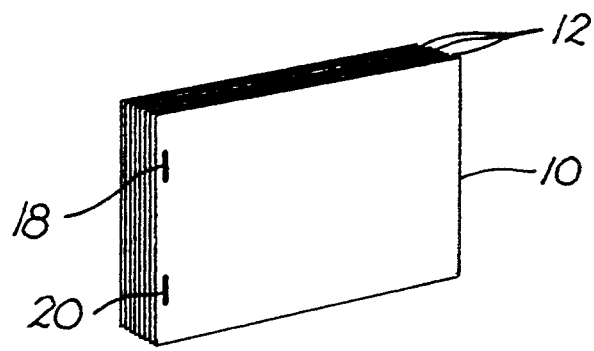
FIG. 1 is a view of a booklet of gaskets illustrating the preferred embodiment of the invention.
Figure 2:
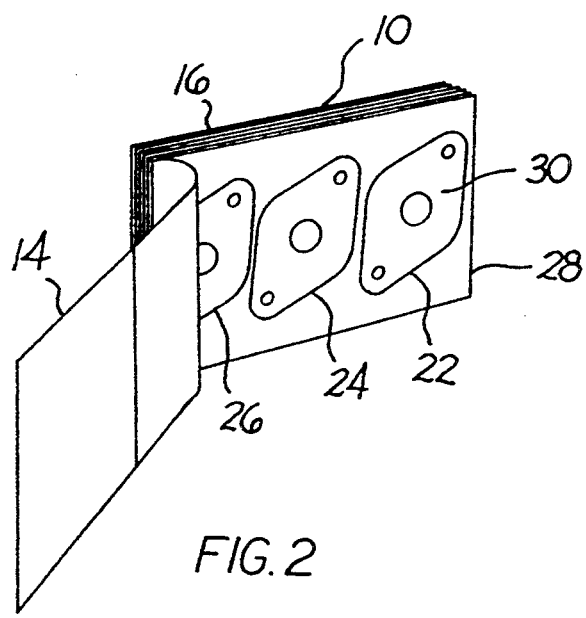
FIG. 2 is a view illustrating the cover folded back to expose a sheet of gasket material.

Referring to the drawings, a preferred booklet 10 of gaskets is illustrated in FIGS. 1 and 2. Booklet 10 comprises a plurality of pages 12 of gasket material, a front cover 14 and a rear cover 16. All the pages and the covers have the same width and length, preferably, 3¾ inches by 8½ inches. Staples 18 and 20 attach the cover and pages 12 together adjacent a narrow end as illustrated in FIG. 1, so that the pages can be opened in the manner of a book.

Referring to FIG. 2, cover 14 can be folded back to expose a page having the profiles of three gasket members 22, 24 and 26 scored on page 28. The gasket material is standard for illustrative purposes, a 32nd of an inch thick. The profiles are partially scored through the thickness of the gasket material so that the user can manually tear an individual gasket from page 28, when needed. Holes, such as illustrated at 30, may be torn from an individual gasket.

Figure 4:
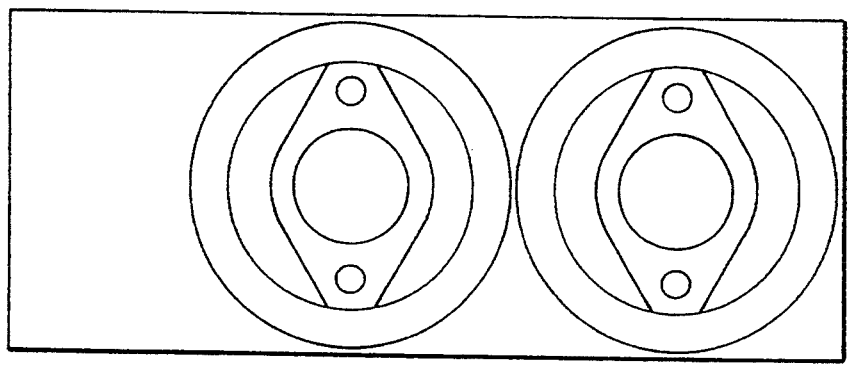
FIGS. 4 and 5 illustrate typical layouts of gaskets on individual pages.
Figure 5:
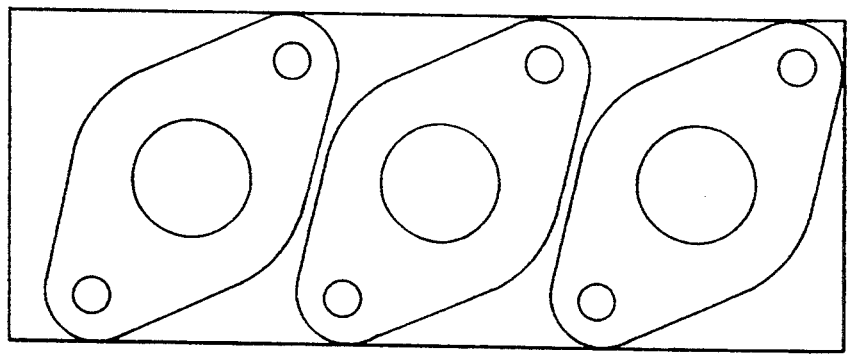

FIGS. 4 and 5 illustrate other pages having scored gasket profiles to illustrate how several gaskets of either different sizes or the same size can be formed on the same page by conventional tooling such as a steel rule die. Other pages may have different thicknesses. For example, the page illustrated in FIG. 4 may be ⅛th of an inch thick.

The booklet may have an individual gasket page with no scoring so that the serviceman can cut a custom-made gasket.

Figure 3:
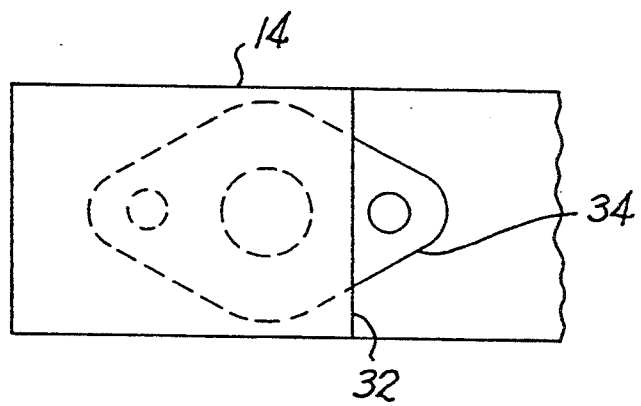
FIG. 3 is a view of the cover holding a loose gasket in the pocket.

FIG. 3 illustrates front cover 14 which is formed of a vinyl material. Rear cover 16 is also formed of a vinyl material. Cover 14 has a pocket 5 inches deep and extending the full width of the page. The pocket is suited to receive an individual loose gasket 34 for temporally receiving one or more loose gaskets.

Figure 6:
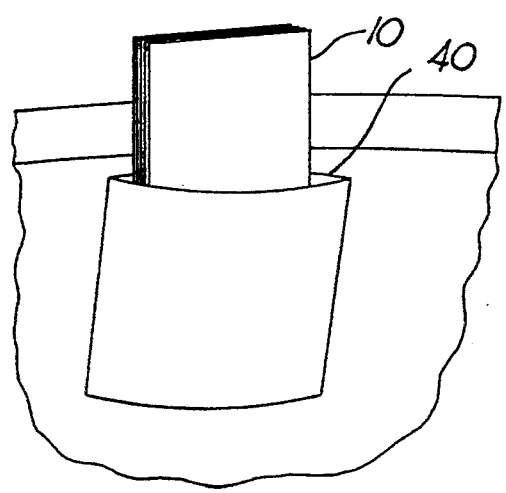
FIG. 6 illustrates the booklet received in the user's pocket.

Referring to FIG. 6, booklet 10 is illustrated disposed in the pocket 40 of a serviceman to illustrate how it can be readily carried around with all of the gaskets retained in one unit, available when required. The gasket material is preferably a black gasket material, well-known to those skilled in the art of refrigeration repair. Each gasket booklet has gaskets most commonly used for standard refrigeration repairs. For illustrative purposes, there may be four of each size gaskets.

Having described my invention, I claim:

1. A booklet of gaskets comprising:
    a plurality of pages, each of the pages being formed of a gasket material and having a common border with a common length and width;
    means for attaching the pages along a common edge thereof in a juxtaposed relationship;
    at least one of the pages of the gasket material having a scored profile of a gasket member for manual removal of the gasket member from the page; and
    said plurality of pages, each having a width of about 3¾ inches so that the booklet may be carried in the pocket of a user's trousers.

* * * * *